(12) United States Patent
Spence

(10) Patent No.: US 8,245,809 B2
(45) Date of Patent: Aug. 21, 2012

(54) SYSTEM FOR AUTOMATICALLY DISLODGING A VEHICLE WINDSHIELD

(75) Inventor: William Jason Spence, Greensboro, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 254 days.

(21) Appl. No.: 12/672,965

(22) PCT Filed: Aug. 23, 2007

(86) PCT No.: PCT/US2007/018619
§ 371 (c)(1),
(2), (4) Date: Feb. 10, 2010

(87) PCT Pub. No.: WO2009/025644
PCT Pub. Date: Feb. 26, 2009

(65) Prior Publication Data
US 2011/0192670 A1  Aug. 11, 2011

(51) Int. Cl.
*B60K 28/12* (2006.01)
*B60K 28/14* (2006.01)
*B60R 21/00* (2006.01)
(52) U.S. Cl. .................. 180/282; 296/84.1; 296/96.11; 296/146.1
(58) Field of Classification Search .............. 180/282; 296/146.1, 84.1, 96.11
See application file for complete search history.

(56) References Cited

U.S. PATENT DOCUMENTS

| 3,737,193 | A |   | 6/1973  | Cain |
|-----------|---|---|---------|------|
| 3,741,583 | A |   | 6/1973  | Usui |
| 4,333,381 | A |   | 6/1982  | Boeglin |
| 4,531,607 | A | * | 7/1985  | Browne ............ 180/282 |
| 5,318,145 | A | * | 6/1994  | Vollmer ............ 180/274 |
| 5,366,241 | A |   | 11/1994 | Kithil |
| 6,101,702 | A |   | 8/2000  | Claycomb |
| 6,202,488 | B1 |  | 3/2001  | Cash |
| 6,227,604 | B1 |  | 5/2001  | Grace |
| 6,364,397 | B1 |  | 4/2002  | Bordeaux |
| 6,518,751 | B1 |  | 2/2003  | Bujak |
| 7,246,819 | B2 |  | 7/2007  | Hofmann |
| 7,988,078 | B1 | * | 8/2011  | Roy et al. ............ 241/33 |

OTHER PUBLICATIONS

International Search Report for corresponding International Application PCT/US2007/018619.

* cited by examiner

*Primary Examiner* — Toan To
(74) *Attorney, Agent, or Firm* — Martin Farrell; Michael Pruden

(57) ABSTRACT

A system for automatically detaching a windshield from a vehicle cab comprises a pressure applying device mounted between a windshield and a frame element, a roll-over condition sensor, and a controller connected to receive a signal indicating a roll-over condition from the roller-over condition sensor and connected to activate the pressure applying device responsive to receiving said signal. The pressure applying device may be one or more pyrotechnic devices. The system includes a delay function to delay activating the pressure applying device to allow the vehicle to come to a rest.

2 Claims, 2 Drawing Sheets

SYSTEM FOR AUTOMATICALLY DISLODGING A VEHICLE WINDSHIELD

BACKGROUND AND SUMMARY

In certain vehicle accidents, it may be difficult, impossible, or unsafe to exit from the doors of the vehicle. In a vehicle roll-over, for example, one door is under the cab and the other door facing upward. In heavy trucks especially, the weight of the door makes it difficult to lift open and hold open, both for an emergency responder and more so for a vehicle occupant attempting this from the inside of the vehicle cab. Egress through the windshield frame may be the fastest and safest alternative.

The windshields in heavy trucks may be designed so that the windshield can be kicked out in the event exit from the doors is difficult or unsafe. If the driver or passenger is not able to kick out the windshield, however, response team personnel must attempt to remove the windshield with tools, usually by cutting it out. This is laborious and time-consuming, and may pose a safety concern, for example, if there is a fire in or around the vehicle, or if the occupants of the vehicle are in need of immediate medical attention.

Methods for dislodging or removing windshields, windows, and doors are known. For example, U.S. Pat. No. 3,737,193 to Cain discloses a collapsed tube disposed about a periphery of a windshield and connected to a high pressure fluid source that inflates the tube when an impact sensor senses the vehicle has been in a collision. Expansion of the tube dislodges the windshield from its mounting. U.S. Pat. No. 3,741,583 to Usui et al. discloses a pyrotechnic device that releases or destroys a windshield or window in a vehicle using the vehicle airbag triggering system to activate it.

While the art discloses systems that activate upon sensing a collision or impact on the vehicle, none are known that respond to a vehicle roll-over, which involves different dynamics than front end or side collisions. For example, an event leading to a roll-over may begin with a front end collision, which in prior system may trigger the windshield release system before event concludes, that is, before the vehicle comes to a rest. The dislodged windshield, now movable, may then pose a danger to the vehicle occupants. As another example, a roll-over may result from a driver attempting a curve at too high a rate of speed, which may involve no frontal collision and a side impact that may not be sufficient to trigger the system.

The invention provides a system for dislodging a vehicle windshield from its mounting automatically upon a vehicle roll-over event.

According to an embodiment of the invention, a system for detaching a windshield from a vehicle cab, comprises a pressure applying device mounted between a windshield and a frame element, a roll-over condition sensor, and a controller connected to receive a signal indicating a roll-over condition from the roller-over condition sensor and connected to activate the pressure applying device responsive to receiving said signal.

The invention, according to another aspect, may further comprise an acceleration condition sensor, the controller being connected to receive a signal indicating an acceleration condition from the acceleration condition sensor, and further configured to activate the pressure applying device responsive to receiving the roll-over condition signal and the acceleration condition signal. According to a preferred embodiment, the acceleration sensor generates a signal when vehicle acceleration ends, that is, when the vehicle has come to a rest. The acceleration sensor may alternatively or in addition be configured to detect a collision event, as in vehicle airbag systems.

In addition or alternatively, the controller is configured with a delay function to delay activating the pressure applying device for a predetermined time period following receipt of a signal indicating a roll-over condition from the roller-over condition sensor.

According to an alternative embodiment, a system of the invention includes the controller being connected to a vehicle device controlling deployment of a vehicle airbag system to receive a signal indicating deployment of the airbag. The controller is configured to use both the roll-over condition sensor and the airbag deployment sensor to trigger the pressure applying device.

According to the invention, a pressure applying device comprises at least one pyrotechnic device. A mounting device for a pyrotechnic device includes a frame element that contains and directs the energy from activated the pyrotechnic device toward the windshield to weaken or break the securing elements.

Alternatively, a pressure applying device comprises an inflatable tube and a gas generating device connected to inflate the tube upon receipt of a signal from the controller.

Other pressure applying devices may be employed, as the invention is not directed to a particular pressure applying device.

BRIEF DESCRIPTION OF THE DRAWINGS

The invention will be better understood by reference to the following detailed description read in conjunction with the appended drawings, in which.

DETAILED DESCRIPTION

Figure 1:
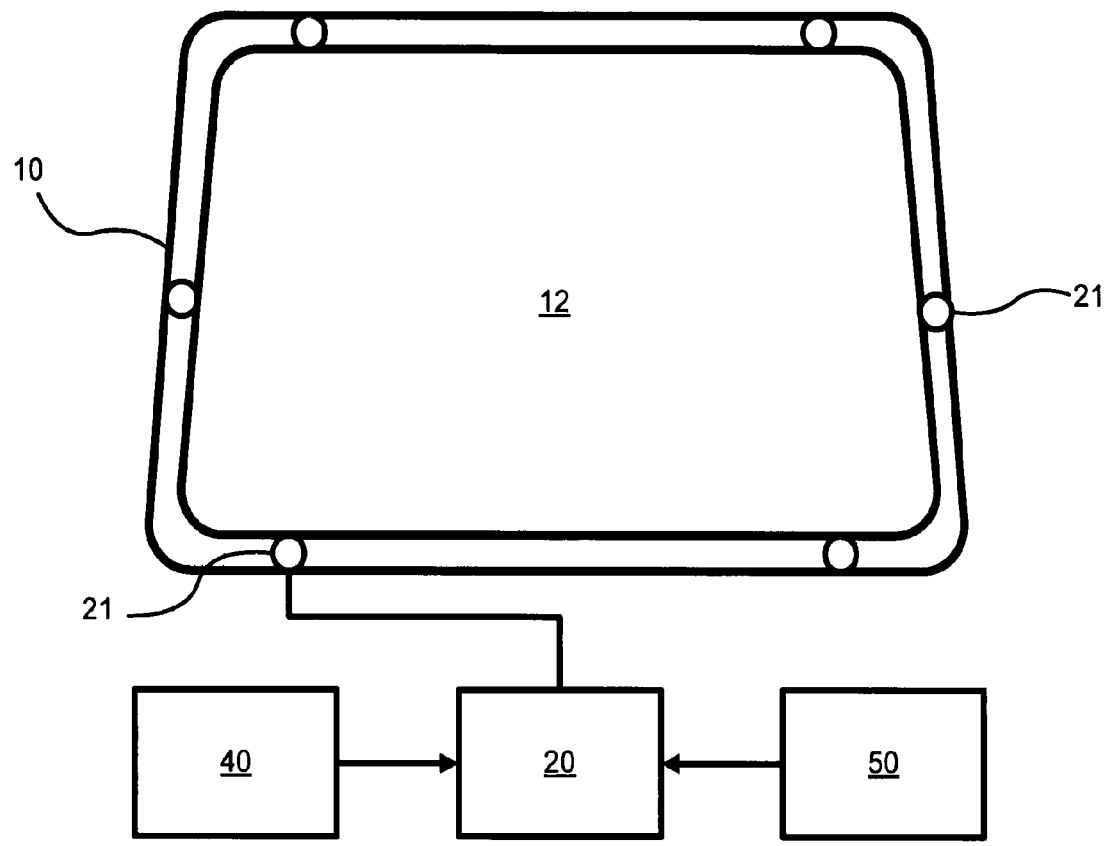
FIG. 1 is a schematic of a windshield dislodging system according to an embodiment of the invention.

FIG. 1 illustrates schematically an automatic windshield dislodging system in accordance with an embodiment of the invention. The system includes a controller 20 that is operatively connected to at least one pressure applying device 21 disposed in a vehicle windshield mounting frame 10. The at least one pressure applying device 21 is configured to dislodge a windshield 12 from the mounting frame 10 upon a signal from the controller 20. By dislodge is meant releasing the windshield 10 from the mounting structure so that it is displaced from the frame or is otherwise readily movable by a person outside the vehicle.

As illustrated, a plurality of pressure applying devices 21 are provided and are distributed on the periphery of the windshield frame 10 so to apply pressure at several points around the frame. In this embodiment, each of the plurality of pressure applying devices 21 is connected to the controller 20 for activation. The pressure applying device may be a pyrotechnic device, such as is used for inflating airbags in vehicles, which generates in a short time highly pressurized gas, which will be directed against the windshield. Those skilled in the art will know how to select a pyrotechnic device having an appropriate energy release to dislodge the windshield.

Figure 2:
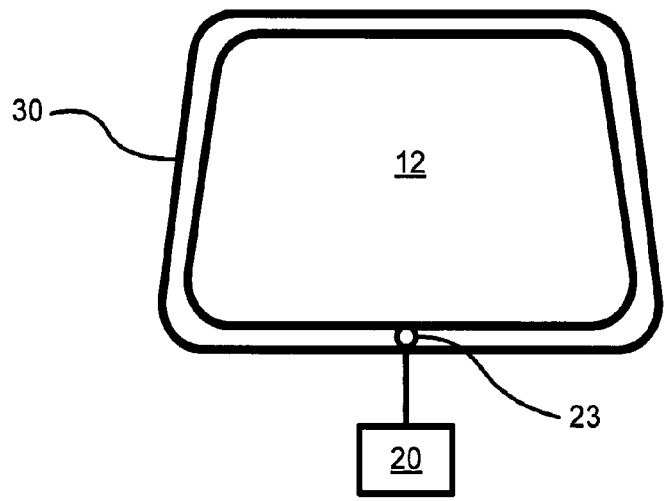
FIG. 2 is a schematic of a windshield dislodging system according to an alternative embodiment.

Alternatively, as shown in FIG. 2, the pressure applying device may be embodied as an inflatable tube 30 disposed about the periphery of the mounting frame in a position so that upon inflation, the tube applies pressure to the windshield 12. A source of pressurized gas 23, for example, a pyrotechnic device, is connected to the tube and activatable by the controller 20. A pyrotechnic device is convenient as the source for rapid inflation of the tube, as is known in the airbag art. A single pyrotechnic device may be used, which will be selected to generate sufficient gas to inflate the tube to an appropriate pressure. Alternatively, two or more smaller pyrotechnic devices may be connected to various points on the tube, for example, to ensure simultaneous expansion of the tube about the periphery of the windshield 12.

Returning to FIG. 1, the controller 20 is connected to receive a signal from a vehicle roll-over sensor or detector 40. The roll-over sensor 40 detects a condition when the vehicle is no longer in a wheels-down attitude and generates a signal for the controller 20. The controller 20 receives the roll-over condition signal and generates a signal to activate the pressure applying device or devices 21.

According to a preferred embodiment, upon receipt of the roll-over signal, the controller 20 initiates a timer (not illustrated) to delay activation of the pressure generating device. The time delay may be chosen, for example, to be of sufficient duration so that the vehicle will likely have come to rest before the windshield is dislodged from the frame.

The time delay may also be used to avoid activating the system based on a spurious roll-over signal. After the time delay expires, the controller 20 will check that the roll-over signal is still valid before activating the pressure applying device.

According to yet another alternative, the system may include an acceleration sensor 50 connected to the controller 20 to deliver a signal relating to the acceleration condition of the vehicle. The acceleration sensor 50 may be configured to detect a collision, which results in a rapid acceleration or deceleration. The controller 20 will use this signal as a check on the validity of the vehicle condition requiring windshield dislodgement, the presence of both a collision condition and roll-over condition indicating an event where release of the windshield is needed.

Alternatively, the acceleration sensor 50 may be configured to detect when the vehicle has come to a rest, that is, the deceleration of the vehicle to a stop. This signal may be used by the controller 20 in place of the time delay, or in conjunction with the time delay, to determine when to activate the pressure generating device.

Figure 3:
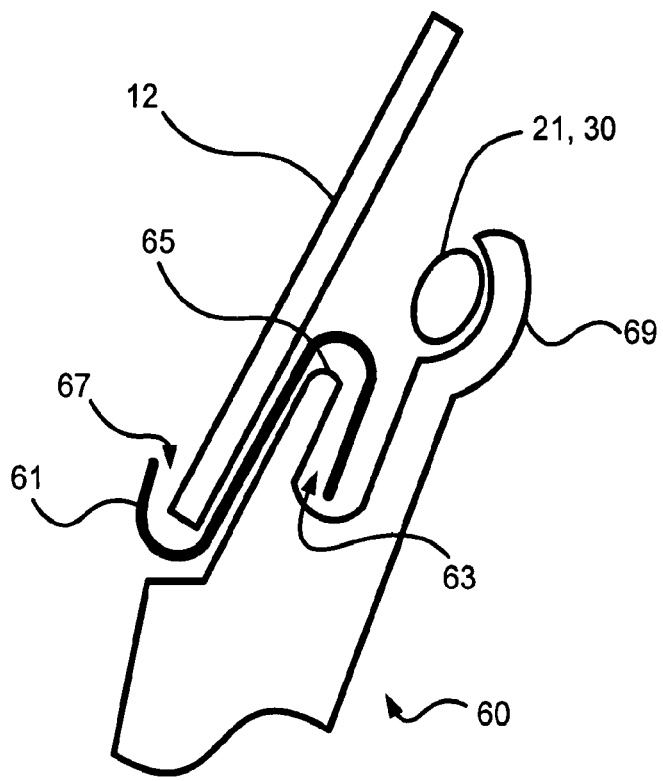
FIG. 3 is simplified section view of an embodiment for mounting a pyrotechnic device to a windshield mounting structure according to a first type; and, FIG. 4 is a simplified section view of an embodiment for mounting a pyrotechnic device to a windshield mounting structure according to a second type.

FIG. 3 shows a side section view, in highly simplified form, of an example of a windshield mounting frame 60 adapted for the invention. The frame 60 in FIG. 3 is of the type in which an elastomeric extrusion 61 retains the windshield 12 and seals the frame 60. The extrusion 61 has an S-shape profile with oppositely facing channels. One channel 63 receives a frame edge 65, while the other channel 67 receives the windshield 12. The frame 60 is modified to support the pressure applying device, which may be the pyrotechnic device 21 or the inflatable tube 30. A member 69 having an arcuate profile is provided to support the device 21, 30 and direct the energy of the expansion of gas toward the windshield 12 and extrusion 61. The member 69 may be a continuous channel formed on the inner periphery of the frame 60, as illustrated. Alternatively, in the case of the pyrotechnic device 21, the member may be configured as individual retaining members, such as cup shaped members, fastened to the frame 60 at appropriate locations.

Figure 4:
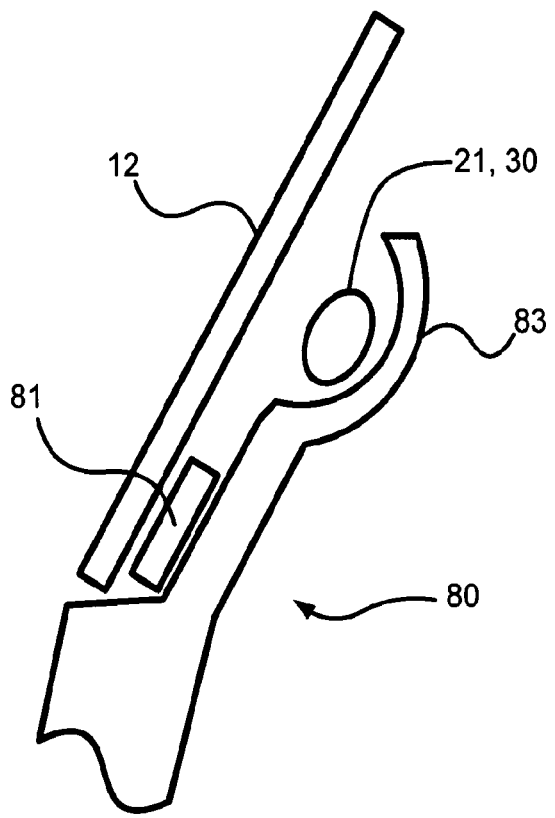

FIG. 4 shows another example of windshield mounting frame 80 adapted for the invention. The frame 80 is configured to bond the windshield 12 with a layer of bonding material 81 applied between the frame and an outer periphery of the windshield. The frame 80 includes a member 83 having a cup-shaped profile to support the pressure applying device 21, 30 and direct the energy of the gas expansion to the windshield 12, as in the embodiment of FIG. 3. The member 83 may be formed as a channel at an inner periphery of the frame 80. Alternatively, in the case of the pyrotechnic device 21, the member 83 may be configured as individual retaining members, such as cup shaped members, fastened to the frame 80 at appropriate locations.

The invention has been described in terms of preferred principles, embodiments, and components; however, those skilled in the art will recognize that equivalents may be substituted for what is described without departing from the scope of the invention as defined in the appended claims.

What is claimed is:

1. A system for automatically detaching a windshield from a vehicle cab, comprising:
   a pressure applying device mounted between a windshield and a frame element in which the windshield is mounted;
   a roll-over condition sensor; and,
   a controller connected to receive a signal indicating a roll-over condition from the roller-over condition sensor, and connected to activate the pressure applying device responsive to receiving said signal,
   wherein the controller further comprises a delay function to delay activating the pressure applying device for a predetermined time period following receipt of a signal indicating a roll-over condition from the roller-over condition sensor.

2. The system as claimed in claim 1, comprising an acceleration condition sensor configured to generate an acceleration condition signal when the vehicle has decelerated to a stop, wherein the acceleration condition sensor is connected to communicate the acceleration condition signal to the controller, and wherein the controller is configured to activate the pressure applying device upon receiving the acceleration condition signal and lapse of the predetermined time period.

* * * * *